US012632666B1

(12) United States Patent　　　(10) Patent No.: US 12,632,666 B1
Chiu　　　(45) Date of Patent: May 19, 2026

(54) ARTIFICIAL INTELLIGENCE AGENT-TO-AGENT COMMUNICATIONS PLATFORM

(71) Applicant: The Joan and Irwin Jacobs Technion-Cornell Institute, New York, NY (US)

(72) Inventor: Ming-Chang Chiu, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 0 days.

(21) Appl. No.: 19/398,372

(22) Filed: Nov. 24, 2025

(51) Int. Cl.
　　*G06F 40/35*　　(2020.01)
　　*G06F 18/22*　　(2023.01)
(52) U.S. Cl.
　　CPC ............. *G06F 40/35* (2020.01); *G06F 18/22* (2023.01)
(58) Field of Classification Search
　　None
　　See application file for complete search history.

(56) References Cited

U.S. PATENT DOCUMENTS

| | | |
|---|---|---|
| 12,417,598 B2 | 9/2025 | Sholl et al. |
| 2020/0005118 A1* | 1/2020 | Chen ...................... G06N 3/084 |
| 2020/0387673 A1* | 12/2020 | Beaver ................... G06Q 50/00 |
| 2024/0249229 A1 | 7/2024 | Rao |
| 2025/0322244 A1 | 10/2025 | Mysore et al. |
| 2025/0356026 A1 | 11/2025 | Myers et al. |
| 2025/0379795 A1* | 12/2025 | Glozman ................ H04L 41/16 |
| 2026/0004785 A1* | 1/2026 | Torok ...................... G10L 15/30 |

OTHER PUBLICATIONS

ArXiv, Shu, Raphael, Towards Effective GenAI Multi-Agent Collaboration: Design and Evaluation for Enterprise Applications (Dec. 6, 2024) (available at https://arxiv.org/html/2412.05449) (last accessed Nov. 10, 2025).
InfoWorld, Fruhlinger, Josh, "What is A2A? How the agent-to-agent protocol enables autonomous collaboration" (Nov. 18, 2025) (available at /mnt/data/NPL What is A2A.pdf).

(Continued)

*Primary Examiner* — Daniel C Washburn
*Assistant Examiner* — Tyler Becker
(74) *Attorney, Agent, or Firm* — M&B IP Analysts, LLC

(57) ABSTRACT

A system and method for mitigating generative artificial intelligence errors during inter-agent communications. A method includes populating an intent field of a schema with an intent value representing an intent of an inter-agent communication session including a first artificial intelligence (AI) agent and a second AI agent, wherein the intent value is determined based on a communication from the first AI agent; comparing each of inputs from the first AI agent and the second AI agent to the schema with respect to the intent value; detecting a misalignment between a first input and the schema when a dissimilarity between the first input and at least a portion of the schema including the intent value exceeds a threshold; and performing a mitigation action based on the detected misalignment in order to mitigate an effect of generative artificial intelligence error on the first input.

20 Claims, 5 Drawing Sheets

(56) References Cited

OTHER PUBLICATIONS

Reduce Hallucination in GenAI: 5 LLM Accuracy Techniques. Future AGI. May 5, 2025 (available at https://futureagi.substack. com/p/five-methods-to-detect-hallucinations) (last accessed Nov. 10, 2025).
International Search Report for PCT/IB2025/062013, dated Feb. 26, 2026. Searching Authority, Israel Patent Office, Jerusalem, Israel.
Written Opinion of the Searching Authority for PCT/IB2025/ 062013, dated Feb. 26, 2026. Searching Authority, Israel Patent Office, Jerusalem, Israel.

* cited by examiner

ARTIFICIAL INTELLIGENCE AGENT-TO-AGENT COMMUNICATIONS PLATFORM

TECHNICAL FIELD

The present disclosure relates generally to agentic artificial intelligence (AI), and more specifically to managing communications between agentic AI systems.

BACKGROUND

Artificial intelligence (AI) systems may incorporate autonomous or semi-autonomous software components referred to as agents that are capable of perceiving inputs, generating outputs, and performing tasks with limited human intervention. These agentic AI systems may rely on machine learning models, symbolic reasoning components, and other components to interpret information, plan actions, and communicate with other agents or external systems.

Agentic AI systems may include or otherwise provide agents access to external systems, for example via application programming interfaces (APIs). Such external system communications may allow agents to communicate with each other. When agents are backed by generative artificial intelligence (genAI) models, communications between agents (inter-agent communications) may allow for much more advanced and nuanced interactions than were previously possible using agents with predetermined conversational data. GenAI models allow agents to interpret unstructured data, reason about user inputs, and create contextually relevant responses.

While agentic AI systems backed by genAI demonstrate promising potential for fully (or near fully) automating certain interactions that previously required substantial amounts of human input, agentic AI solutions utilizing genAI models also inherit some of the drawbacks of genAI models. Solutions that overcome these challenges would therefore be highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method. The method comprises: populating at least one intent field of a schema with at least one intent value representing an intent of an inter-agent communication session including a first artificial intelligence (AI) agent and a second AI agent, wherein the at least one intent value is determined based on a communication from the first AI agent; comparing each of a plurality of inputs from the first AI agent and the second AI agent to the schema with respect to the at least one intent value; detecting a misalignment between a first input of the plurality of inputs and the schema when a dissimilarity between the first input and at least a portion of the schema including the at least one intent value exceeds a threshold; and performing a mitigation action based on the detected misalignment in order to mitigate an effect of at least one generative artificial intelligence error on the first input.

Certain embodiments disclosed herein also include a non-transitory computer-readable medium having stored thereon causing a processing circuitry to execute a process, the process comprising: populating at least one intent field of a schema with at least one intent value representing an intent of an inter-agent communication session including a first artificial intelligence (AI) agent and a second AI agent, wherein the at least one intent value is determined based on a communication from the first AI agent; comparing each of a plurality of inputs from the first AI agent and the second AI agent to the schema with respect to the at least one intent value; detecting a misalignment between a first input of the plurality of inputs and the schema when a dissimilarity between the first input and at least a portion of the schema including the at least one intent value exceeds a threshold; and performing a mitigation action based on the detected misalignment in order to mitigate an effect of at least one generative artificial intelligence error on the first input.

Certain embodiments disclosed herein also include a system. The system comprises: a processing circuitry; and a memory, the memory containing instructions that, when executed by the processing circuitry, configure the system to: populate at least one intent field of a schema with at least one intent value representing an intent of an inter-agent communication session including a first artificial intelligence (AI) agent and a second AI agent, wherein the at least one intent value is determined based on a communication from the first AI agent; compare each of a plurality of inputs from the first AI agent and the second AI agent to the schema with respect to the at least one intent value; detect a misalignment between a first input of the plurality of inputs and the schema when a dissimilarity between the first input and at least a portion of the schema including the at least one intent value exceeds a threshold; and perform a mitigation action based on the detected misalignment in order to mitigate an effect of at least one generative artificial intelligence error on the first input.

Certain embodiments disclosed herein include a method, non-transitory computer-readable medium, or system as noted above or below, further comprising or being configured to perform a process in accordance with the following features: determining a proposed intent based on the communication from the first AI agent; and verifying the proposed intent by prompting the first AI agent, wherein the at least one intent value is determined based on the verified proposed intent.

Certain embodiments disclosed herein include a method, non-transitory computer-readable medium, or system as noted above or below, further comprising or being configured to perform a process in accordance with the following features: determining a first role of the first AI agent and a second role of the second AI agent; and populating a first role field and a second role field of the schema with a first role value indicating the first role and a second role value indicating the second role, wherein the misalignment is detected based further on the first role value and the second role value.

Certain embodiments disclosed herein include a method, non-transitory computer-readable medium, or system as noted above or below, further comprising or being configured to perform a process in accordance with the following features: classifying the inter-agent session into a classification based on the plurality of inputs; and selecting a first protocol from among a plurality of protocols based on the classification, wherein the first protocol defines the schema.

Certain embodiments disclosed herein include a method, non-transitory computer-readable medium, or system as noted above or below, further comprising or being configured to perform a process in accordance with the following features: generating a vector representation of the at least a portion of the schema including the at least one intent value; and generating a vector representation of the first input, wherein the dissimilarity between the first input and the at least one intent value is determined based on the vector representation of the at least a portion of the schema including the at least one intent value and the vector representation of the first input.

Certain embodiments disclosed herein include a method, non-transitory computer-readable medium, or system as noted above or below, further comprising or being configured to perform a process in accordance with the following features: determining a distance between the vector representation of the at least a portion of the schema including the at least one intent value and the vector representation of the first input, wherein the dissimilarity is determined based on the distance.

Certain embodiments disclosed herein include a method, non-transitory computer-readable medium, or system as noted above or below, further comprising or being configured to perform a process in accordance with the following features: wherein the at least one intent value includes a first intent value and a second intent value, wherein the first intent value is determined based on the communication from the first AI agent, wherein the second intent value is determined based on a communication from the second AI agent.

Certain embodiments disclosed herein include a method, non-transitory computer-readable medium, or system as noted above or below, further comprising or being configured to perform a process in accordance with the following features: tracking at least a portion of the plurality of inputs by recording transaction data generated based on the plurality of inputs on a blockchain.

Certain embodiments disclosed herein include a method, non-transitory computer-readable medium, or system as noted above or below, further comprising or being configured to perform a process in accordance with the following features: wherein the first input is communicated by the first AI agent, wherein performing the mitigation action further comprises: prompting the first AI agent with text indicating that the first input is misaligned, wherein the first AI agent provides a new first input in response to being prompted with the text indicating that the first input is misaligned.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
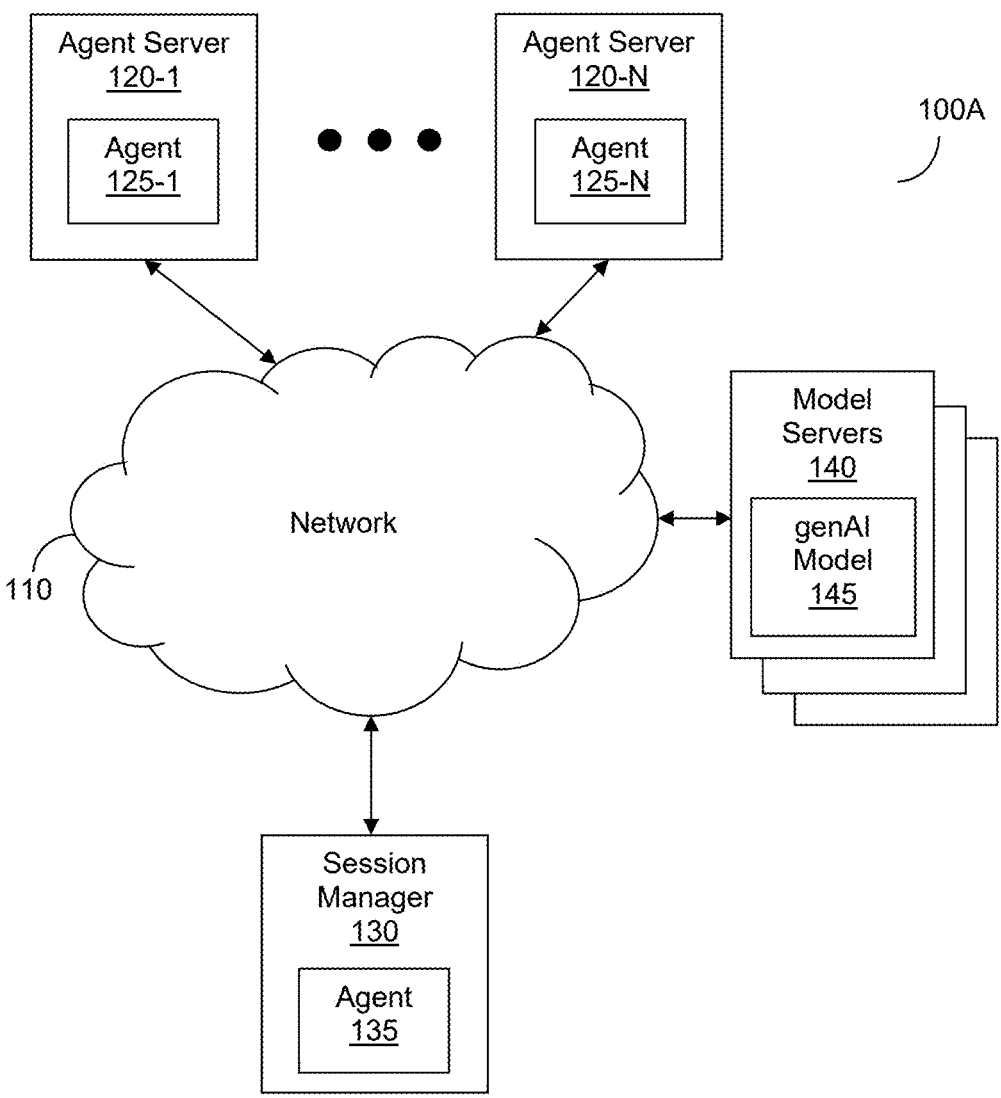
FIGS. 1A-B are network diagrams utilized to describe various disclosed embodiments.

The various disclosed embodiments include a platform for managing agent-to-agent communication sessions as well as methods and systems used to realize such a platform. The disclosed embodiments may be utilized to realize solutions involving agentic artificial intelligence (AI) systems and, in particular, involving agentic AI systems which utilize generative AI (genAI) models in order to realize agents. The disclosed embodiments provide various techniques and platforms which allow for reducing hallucinated communications between agents or otherwise for reducing the effects of erroneous behavior of genAI models which may be caused by genAI errors such as, but not limited to, hallucinations, inaccuracies, misrepresentations, faulty reasoning, inaccurate facts, inaccurate numbers, mistranscriptions, combinations thereof, and the like. This reduction in the effects of genAI errors, in turn, accelerates inter-agent communications and reduces the amount of computing resources needed to complete an inter-agent session involving such communications.

In accordance with various disclosed embodiments, communications between AI agents are managed based on a protocol which defines a common schema to be used for anchoring communications between the AI agents. The schema is defined at least with respect to an intent field which is populated with an intent value representing an intent of an interaction being realized via an inter-agent session. The intent value may be determined based on one or more communications from one or more of the agents involved in the inter-agent session such that the intent value represents an intent by one or more of the agents for the inter-agent session.

Once the intent is established by populating the schema with values including one or more intent values, the schema may be utilized to anchor communications between the agents. To this end, the schema may be provided to each of the agents, the schema may be utilized to analyze communications from each of the agents, or both. The intent may be referenced in order to detect inputs which are not aligned with the intent, for example by determining a distance between a vector representing the intent (for example, a vector representing at least a portion of a schema including one or more intent values representing the intent) and a vector representing a given input and determining whether that distance is above a threshold. If the intent and a given input are dissimilar (for example, distance above a threshold), then a misalignment may be detected and mitigated. This reduces the impact of hallucinations or other effects of erroneous behavior caused by genAI errors on the inter-agent session, thereby preventing the session from being derailed by hallucinated communications.

It is noted that generative artificial intelligence (genAI) models which may be utilized to realize agentic AI solutions have a tendency to hallucinate or otherwise generate erroneous content due to the partially randomized nature inherent in how many such models create content. It has been identified that these hallucinations and erroneous content may cause models used for agentic AI to lose track of the context of the broader interaction, which in turn may cause them to "manufacture" new focuses of the transaction. For example, "purchase a toy car" may morph into "purchase a Ferrari" (i.e., a real Ferrari, not a toy) during an inter-agent session, thereby derailing the interaction. This can cause the inter-agent session to yield an absurd or otherwise unintended result.

These hallucinations and other results of genAI errors may therefore waste computing resources as agents negotiate or otherwise interact with respect to a goal which does not match the original intent. This makes interactions slower and utilizes excessive processing power and memory due to redundant or otherwise extraneous processing of inputs by models, network communications between models, storage of input data (for example, in local memories), total numbers of messages or other sets of data being transmitted, and the like. That is, hallucinations by one (or both) agents may cause the inter-agent session to deviate from an original goal, purpose, or focus. A hallucination or otherwise erroneous output by one agent may cause a cascading effect, where the other agent continues generating text or other content based on the hallucinated or erroneous content. This can cause an inter-agent session to produce nonsense or otherwise inappropriate results.

It has been identified that defining a proposed intent at the outset of the interaction allows for anchoring the inter-agent session around a common goal, which reduces the effect of hallucinations or other genAI errors on the models used to realize the AI agents. Additionally, the intent may be referenced by the system managing the inter-agent session (for example, the session manager 130) in order to detect misalignments (i.e., inputs from agents which deviate from the previously established intent). This allows for correcting any hallucinations that may occur earlier, thereby further improving the speed and further conserving computing resources which would otherwise need to be expended to return the inter-agent session to the proper goal.

Various disclosed embodiments may further utilize a blockchain in order to track communications using the blockchain as an immutable record. Additionally, at least some disclosed embodiments may be run via decentralized applications (dApps) or other decentralized software via Web 3.0 in order to realize the session management as described herein.

Figure 1B:
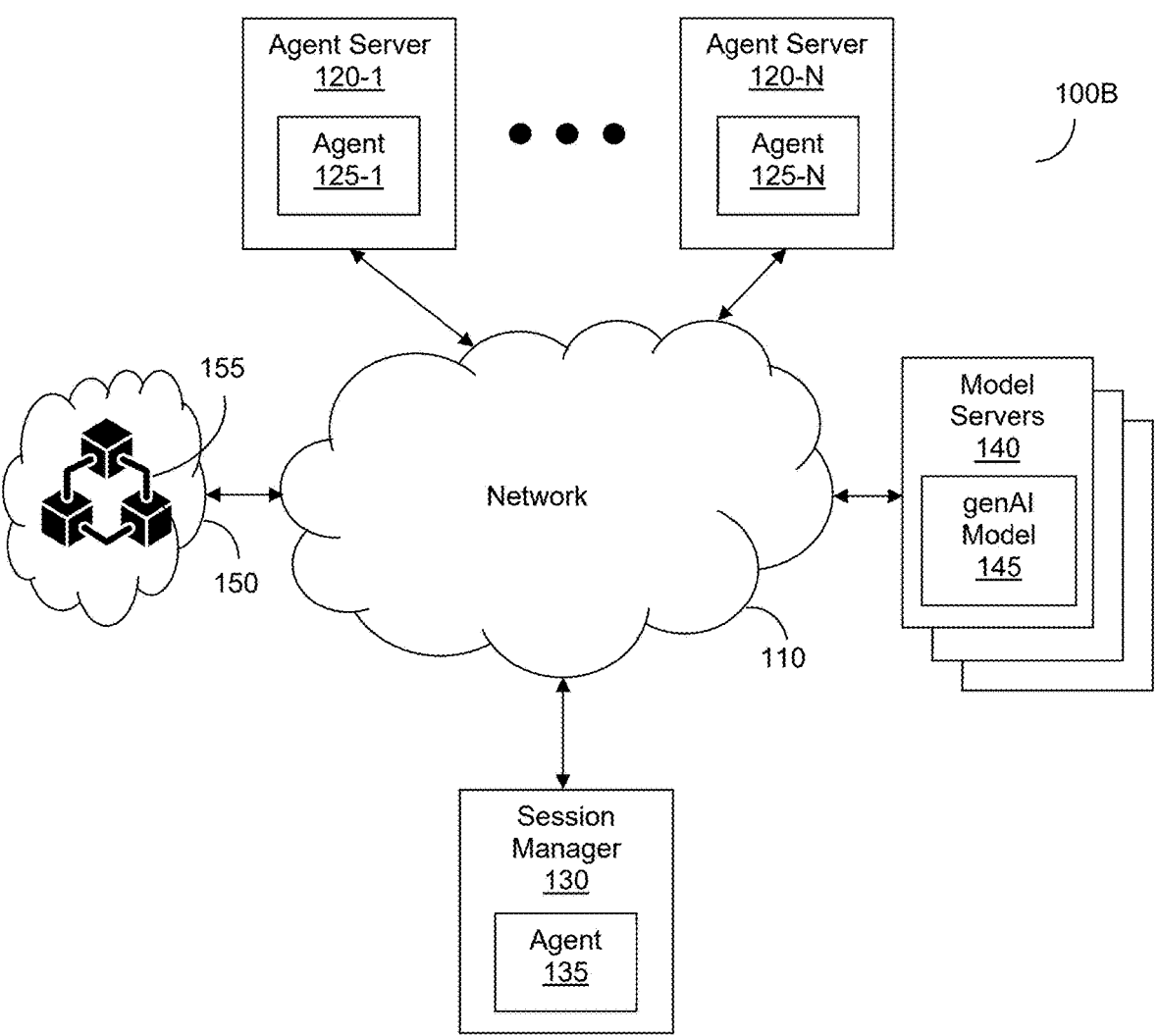

FIGS. 1A-B are network diagrams 100A-B utilized to describe various disclosed embodiments. The example network diagrams 100A-B illustrate communications between and among agentic servers 120-1 through 120-N (where N is an integer having a value of 1 or greater), a session manager 130, a model server 140 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

As depicted in FIGS. 1A-B, each of the agent servers 120 has a corresponding agent 125. Each agent 125 is a software component utilized to interact with other systems such as, but not limited to, the session manager 130, other agents 125, other systems deployed in computing environments with the agents 125 (not shown), combinations thereof, and the like. To this end, each agent 125 may be, may include, or may communicate with a generative artificial intelligence (genAI) model.

In the example implementation shown in FIGS. 1A-B, such a genAI model may be one of the genAI models 145 deployed via one of the model servers 140. It should be noted that other implementations may incorporate the genAI model used by each agent 125 within the agent server 120 of that agent or otherwise via a system accessible to the agent 125. Each genAI model 145 is configured to generate content such as, but not limited to, text, based on prompts including content such as, but not limited to, text. The genAI model 145 may be, but is not limited to, a language model such as, but not limited to, a large language model (LLM). Each genAI model 145 is configured to generate content such as, but not limited to, text, images, video, combinations thereof, and the like. To this end, each genAI model 145 is configured to receive prompts (for example, prompts including text indicating a request for a certain kind of content) and to generate content based on such prompts.

Such a genAI model 145 may be further supported with additional models (not shown), which may also be genAI or otherwise may be machine learning models, for example, models configured to analyze types of content other than text such as images, audio, and the like. Such supporting models may enable the genAI model 145 to accept different modalities of inputs (for example, supporting both text and images as inputs) or otherwise to process different modalities of content.

The session manager 130 is configured to manage inter-agent sessions between and among the agents 125 in accordance with various disclosed embodiments. To this end, each of the agents 125 may communicate with the session manager 130 in order to provide inputs related to an interaction or otherwise as part of an inter-agent session. In this regard, in implementations depicted in FIGS. 1A-B, the session manager 130 may act as an intermediary which accepts and analyzes content to be used as inputs for other agents 125.

More specifically, in accordance with various disclosed embodiments, the session manager 130 is configured to analyze content provided by each agent 125 during an inter-agent session with respect to an intent established earlier in the inter-agent session. The session manager 130 is further configured to detect content which deviates from such an intent, and may perform mitigation actions such as prompting the agent 125 which provided the deviating content in order to bring the agents back to communicating in line with the applicable intent. As noted above, such deviations may arise from hallucinations or other genAI errors by genAI models used by AI agents, which may derail communications between the AI agents in a manner which wastes computing resources and makes the inter-agent session slower.

In accordance with various disclosed embodiments, the session manager 130 includes or is otherwise utilized to realize an agent 135. The agent 135 may communicate with each of the agents 125 that participate in inter-agent sessions in order to accept inputs from the agents 125, to prompt the agents 125 (for example, to prompt an agent 125 to correct a misalignment by indicating that a previous communication from the agent 125 deviated from an intent of an inter-agent session), and the like.

FIG. 1B shows another implementation in which a blockchain 155 is utilized. As depicted in FIG. 1B, the blockchain 155 may be deployed or otherwise realized via a blockchain network 150. The blockchain network 150 may connect various nodes (not shown), any or all of which may store a copy of the data of the blockchain 155. In some implementations, the blockchain 155 is utilized to store transaction data, where at least a portion of the transaction data includes data used to track communications between agents 125 during inter-agent sessions. In such implementations, the blockchain 155 may act as an immutable record of inter-agent communications, which may allow for auditing or otherwise checking the communications later.

The blockchain 155 may further be utilized to confirm or otherwise check payment prior to completing certain interactions pursuant to inter-agent sessions. To this end, the blockchain 155 may store transaction data indicating records of ownership of cryptocurrency. In some embodiments, such transaction data may be checked to confirm that an agent which is, for example, making a purchase as part of an inter-agent session classified as a purchase, has sufficient funds to complete the purchase.

In some implementations, the blockchain 155 may be utilized to realize one or more decentralized computing functions such as, but not limited to, a decentralized application (dApp). Such a decentralized computing function may be realized by storing code among the blockchain 155 and executing the code via nodes of the blockchain network 150. The code executed via nodes of the blockchain network 150 may include instructions that, when executed by processing circuitries of the nodes, configure the nodes to collectively perform one or more functions in accordance with at least some disclosed embodiments.

In some embodiments, the decentralized code includes instructions that, when executed by one or more processing circuitries, configure the processing circuitries to perform activities in order to track communications. Such activities may include, but are not limited to, generating transaction data, submitting the transaction data to the nodes for verification via a consensus protocol or other protocol used to verify the state of the blockchain 155, to upload the transaction data for recording on the blockchain 155, combinations thereof, and the like.

Figure 2:
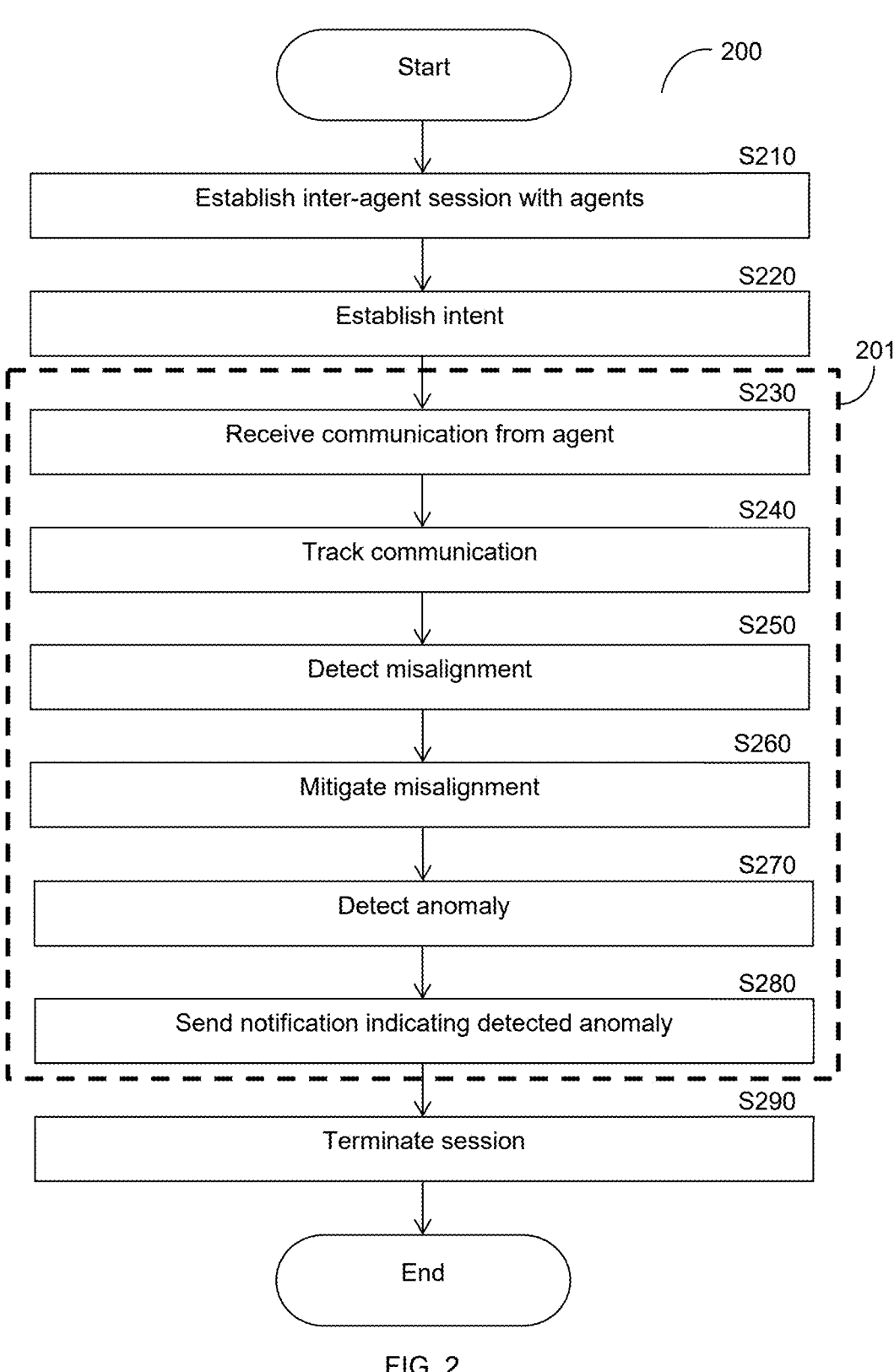
FIG. 2 is a flowchart illustrating a method for managing agent-to-agent communications according to an embodiment.
Figure 3:
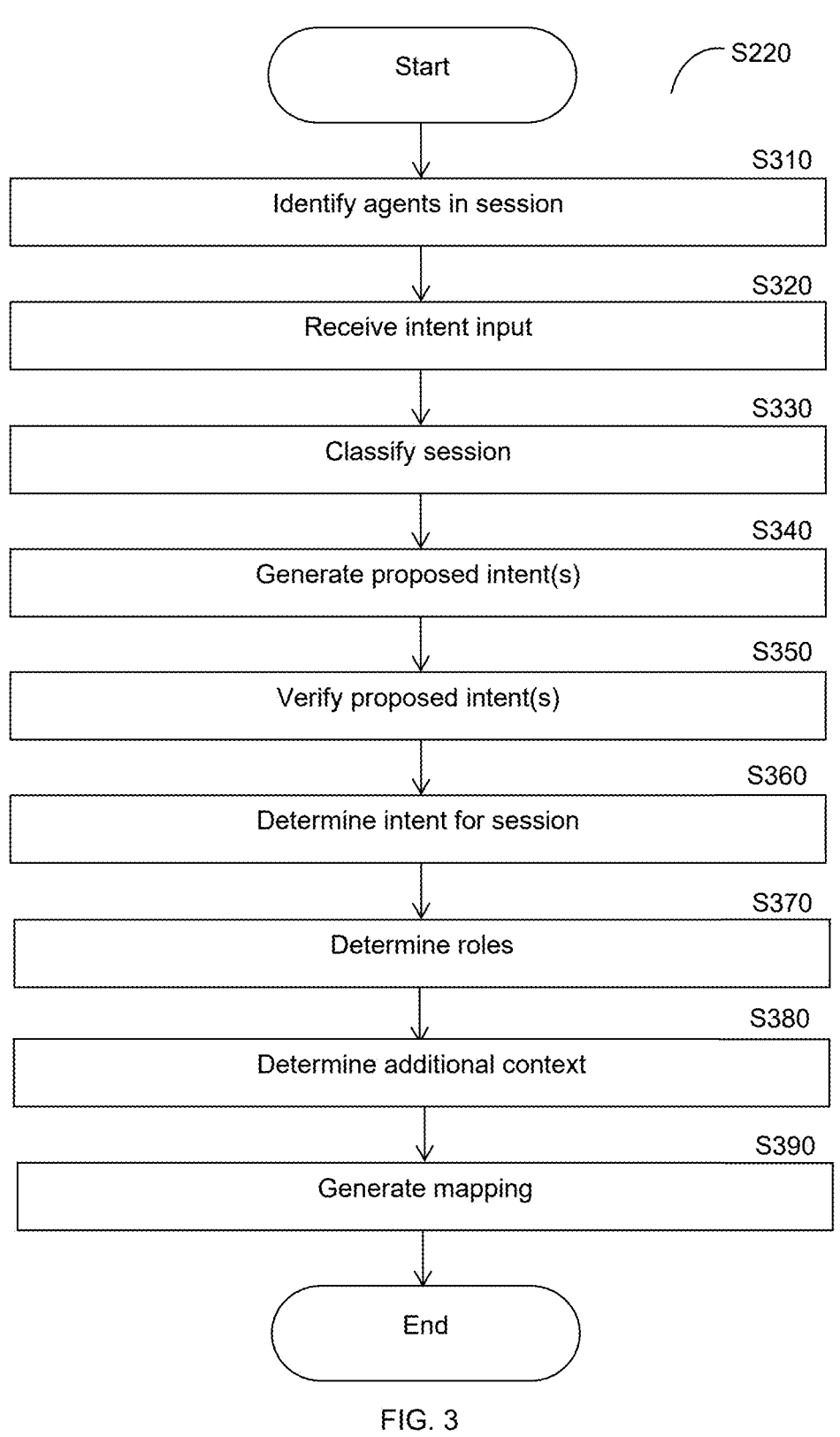
FIG. 3 is a flowchart illustrating a method for establishing intent for a session according to an embodiment.

In some embodiments, the decentralized code includes instructions that, when executed by one or more processing circuitries, configure the processing circuitries to perform activities to manage inter-agent sessions (for example, any or all of the steps of FIG. 2 or 3). In this regard, the nodes of the blockchain network 150 may perform at least a portion of the disclosed processes in some embodiments. This may allow, for example, utilizing the nodes rather than a central management system. The owners of the nodes may be incentivized to perform such operations, for example, by awarding rewards tracked via the blockchain 155 (for example, cryptocurrency, non-fungible tokens, or other digital assets whose ownership is recorded on the blockchain 155).

It should be noted that FIGS. 1A-B depict certain implementations of various disclosed embodiments, but that at least some disclosed embodiments are not necessarily limited as such. Other deployments, arrangements, combinations, and the like, may be equally utilized without departing from the scope of the disclosure. In some implementations, the session manager 130 could be deployed in one of the agent servers 120 or otherwise such that it may be deployed in-line between the agents 125.

FIG. 2 is a flowchart 200 illustrating a method for managing agent-to-agent communications according to an embodiment. In an embodiment, the method is performed by the session manager 130, FIGS. 1A-B.

At S210, an inter-agent session is established. In an embodiment, S210 includes establishing a communications session with each agent to be involved in the inter-agent session. The inter-agent session has multiple agents (for example, agents among the agents 125, FIGS. 1A-B) participate. In some implementations, the inter-agent session is between a first agent and a second agent (for example, a first agent 125-1 and a second agent 125-2), each of which communicates with a session manager (for example, the session manager 130, which may utilize its own agent 135 to facilitate the inter-agent session between the agents 125).

In other implementations, three or more agents may participate in the inter-agent session.

The agents may be or may include AI agents, i.e., agents which utilize AI models in order to realize at least a portion of their functions. In accordance with various disclosed embodiments, the AI agents are genAI agents which utilize genAI models to communicate. For example, such genAI agents may prompt or otherwise access language models or other genAI models configured to generate text in order to communicate in natural language.

The inter-agent session may therefore be an interlinked session which links multiple communications sessions (i.e., the communication session with each agent). As a non-limiting example when a session manager (for example, the session manager 130) manages agent-to-agent communications between a first agent (for example, an agent 125-1) and a second agent (for example, an agent 125-2), the inter-agent session is realized as an interlinked session including a first communications session between the session manager and the first agent which is interlinked with a second communications session between the session manager and the second agent.

In some embodiments, establishing the inter-agent session may further include authenticating each agent which will participate in the inter-agent session. To this end, in such an embodiment, S210 further includes receiving one or more inputs (for example, authentication credentials such as a username and password or other secret) from each agent used to demonstrate the identity of the agent and authenticating each agent. If any agent is not successfully authenticated, then the inter-agent session may not be conducted with that agent.

It should be noted that various disclosed embodiments are discussed with respect to a single inter-agent session involving two agents for simplicity purposes, but that additional inter-agent sessions may be conducted simultaneously in order to manage communications among three or more agents according to at least some embodiments. In some further embodiments, each inter-agent session is between exactly two agents, with the inter-agent session including interlinked communication sessions with each of the two agents. Multiple inter-agent sessions may be managed in accordance with intent-based protocols as described herein.

At S220, an intent is established for the inter-agent session. Establishing the intent may include mapping the inter-agent session to one or more intents. To this end, in an embodiment, the intent is established by at least partially populating a schema defined according to a protocol. More specifically, an intent field of the schema is populated with an intent value which represents the established intent. To this end, the intent value may be, for example but not limited to, a string or other text representing the intent. The intent may be established based on data explicitly indicating the intent (i.e., explicitly indicating the intent value) or by inferring the intent based on data from one or more of the agents involved in the inter-agent session.

In an embodiment, establishing the intent includes identifying the agents participating in the session and receiving one or more inputs indicative of the intended interaction, such as text or other data specifying a request, command, or instruction. Based on these inputs, the session may be classified into a type of interaction such as a service request, purchase, information query, or bid. A proposed intent is then generated, for example as text describing a target, goal, or other focus of the interaction. The proposed intent may be verified with one or more of the participating agents to ensure accuracy and alignment.

In an embodiment, when the intent has been verified, one or more intent values are determined for the session, and the intent is mapped to the session by at least populating one or more fields of a schema (for example, a JSON schema) with the determined intent value or values. The schema may be further populated by values which provide additional context about the inter-agent session such as, but not limited to, roles of the agents participating in the inter-agent session, language of the inputs being provided to each agent (for example, a language in which a user communicates with the agent), models (for example, genAI models) being used by each agent, and the like. The populated schema is utilized during the inter-agent to anchor communications and reduce hallucinations, erroneous content, other results of genAI errors, or other misaligned outputs which might appear in outputs or otherwise be output by genAI models used by agents.

An example process for establishing intent which may be utilized at S220 is described further below with respect to FIG. 3.

Once the intent has been established for the inter-agent session, communications with the agents may proceed pursuant to the session as part of the subprocess 201. During the subprocess 201, communications between the agents are realized using an intermediary in the form of the system or software component managing the inter-agent session (for example, the session manager 130 or the agent 135). Communications may continue in iterations during the subprocess 201 until one or more termination conditions are met (for example, an agent sending data indicating that the interaction is complete or otherwise that the session should be terminated). In this regard, each of the steps among the subprocess 201 may be performed repeatedly as many times as is relevant (for example, communications may be received at S230 for as many communications are received from the agents).

At S230, a communication is received from one of the agents involved in the inter-agent communication session. The communication includes content such as, but not limited to, text, images, audio, video, other multimedia content, combinations thereof, and the like. The communication may be received via an interface, and may further include metadata indicating information about the communication such as the identity of the agent that transmitted the communication, a timestamp indicating a time of the communication, both, and the like.

At S240, the communication is tracked. In an embodiment, tracking the communication includes generating and storing data representing the communication. Such data may include or indicate, for example, the content of the communication, the metadata of the communication, an order of the communication relative to other communications in the inter-agent session, which agent transmitted the communication, combinations thereof, and the like.

In some embodiments, the communications may be tracked via blockchain. To this end, in a further embodiment, S240 includes generating transaction data indicating the communication for recording on the blockchain. Such transaction data may be recorded, for example, once the transaction data is generated, after a certain amount of transaction data has been generated (for example, a predetermined threshold amount of transaction data), during a final iteration of the subprocess 201 before the session is terminated, and the like.

In some embodiments, at least a portion of the data to be recorded as part of the tracking may be sensitive data or other data for which the data is to be kept secret. To this end, in such an embodiment, S240 may include applying one or more cryptographic techniques to at least a portion of the data to be recorded. Such cryptographic techniques may be or may include, but are not limited to, secure computation, zero-knowledge proof, both, and the like.

The following steps S250 through S280 describe steps which may be performed when a communication from one of the agents demonstrates an abnormality (for example, a misalignment or anomaly). Each of these steps may therefore be optional, and is not necessarily performed at every iteration of the subprocess 201.

At S250, a misalignment is detected. In an embodiment, detecting the misalignment includes comparing at least a portion of the communication to the intent value stored within the session schema.

In a further embodiment, the comparison is performed by generating vector representations (for example vectors representing certain aspects) of both the established intent (for example, of a schema or portion thereof including one or more intent values representing the established intent) and at least a portion of the received communication, and determining a distance between the resulting vectors. In such an embodiment, an embedding model may be utilized to convert the intent value and the communication content (for example, text of the communication or text summarizing other modalities included in the communication) into respective vectors in a semantic embedding space. A distance between the vectors is determined. In a further embodiment, a misalignment is identified when the distance between the vectors exceeds a threshold, thereby indicating that the communication is semantically dissimilar from the established intent. This vector-based comparison allows for automatically detecting hallucinatory or otherwise off-topic inputs that could cause the inter-agent session to deviate from its intended goal.

In another embodiment, the comparison is performed by providing a generative artificial intelligence model (for example a genAI model used by the agent 135, FIGS. 1A-B) with a prompt that includes text representing the intent value together with text derived from the communication, such as the full text of the communication or text summarizing other modalities of content included therein. The genAI model may return an indication of whether the communication is consistent with or divergent from the established intent, thereby enabling detection of misaligned or hallucinatory content that could otherwise cause the inter-agent session to drift away from its originally defined goal.

In yet another embodiment, one or more machine learning models trained to classify values within communications or the communications themselves as either misaligned or properly aligned based on a baseline learned via training (for example, by tuning weights of the model) may be applied in order to detect the misalignment. Such a non-generative machine learning model may be more flexibly deployed and updated over time as compared to a static rules-based threshold while utilizing fewer computing resources than a genAI model such as a LLM.

At optional S260, a user is prompted for feedback on the detected misalignment. In an embodiment, S260 includes generating a message or interface element requesting that the user confirm whether the detected misalignment is correct. To this end, in a further embodiment, such message or interface element may include text indicating such a request as well as text indicating one or more aspects of the intent defined in the schema. Such text may include, but is not limited to, an intent value, a role of each agent, additional contextual values, a combination thereof, and the like.

Such user feedback may therefore be utilized to verify the deviation from the intent. Accordingly, in some embodiments, when the user feedback indicates that the detected misalignment is not correct (i.e., there is not actually misalignment), then subsequent processing related to mitigating the misalignment may be avoided for this communication. Consequently, such user feedback confirmation of misalignment may allow for conserving computing resources related to attempting to mitigate misalignments which were false positives. In some embodiments, the user feedback may be analyzed, for example using a genAI model (for example, a genAI model used by the agent 135, FIGS. 1A-B). Such a genAI model may analyze the user feedback in order to determine whether the user feedback indicates that the misalignment is a true positive or false positive.

The feedback received from the user may further include text to be utilized for correcting or otherwise mitigating the detected misalignment. Such text may be incorporated into or otherwise used to generate a prompt to the AI agent which transmitted the misaligned communication in order to cause the AI agent to generate and transmit a new communication which is more likely to be aligned or otherwise to mitigate the hallucinated content which caused the misaligned communication to be generated and transmitted. In some embodiments, the feedback may indicate that the inter-agent session should be restarted. In such embodiments, when feedback indicating that the inter-agent session should be restarted is received, the inter-agent session may be restarted.

At S270, an anomaly is detected in the communication sent at the current iteration of S230. The anomaly may be or may include one or more anomalous values indicated in the communication (for example, values represented in text of the communication) or In an embodiment, detecting the anomaly includes identifying anomalous characteristics within the communication such as, but not limited to, anomalous numerical values (for example, that deviate from a or parameters that fall outside an expected range for the interaction. In some embodiments, detecting the anomaly further include comparing at least a portion of the communication to one or more baseline values. In another embodiment, one or more machine learning models trained to classify values within communications or the communications themselves based on a baseline learned via training (for example, by tuning weights of the model).

In an embodiment, the anomaly is detected based on one or more factors such as, but not limited to, geolocation of the user of each agent (for example, of a user device accessing each agent), network location of the user of each agent (for example, of a user device accessing each agent), values included in data sent during the inter-agent session (for example, numerical values), combinations thereof, and the like. The anomaly may be detected as a deviation from a baseline which may be defined with respect to any or all of these factors. In a further embodiment, the anomaly is detected by applying a machine learning model to metadata or data extracted from one or more inputs from an agent. In yet a further embodiment, the machine learning model may be trained per-agent such that the machine learning model is trained to detect behavior which is anomalous for a specific agent (for example, based on historical geolocation, network location, values, or other data of that agent).

At S280, a notification indicating the detected anomaly is sent, for example, to the agent which sent the anomalous communication. In some embodiments, the notification may be or may include data (for example, text) identifying the nature of the anomaly or may request that the agent regenerate or correct the communication which contained the anomaly or was otherwise determined to be anomalous. In other embodiments, the notification may be transmitted to additional components or supervisory systems associated with the inter-agent session. Providing such a notification allows the session manager to surface irregularities to relevant participants or systems and to facilitate corrective action when needed.

At S290, the session is terminated. As noted above, the session may be terminated when one or more termination conditions are met (for example, an agent sending data indicating that the interaction is complete or otherwise that the session should be terminated).

FIG. 3 is a flowchart S220 illustrating a method for establishing intent for a session according to an embodiment.

At S310, agents involved in an inter-agent session are identified. In an embodiment, the identified agents include each agent with which communications were established for the inter-agent session (for example, as discussed above with respect to S210).

At S320, inputs indicating an intent of an interaction (i.e., the interaction which is being realized via the inter-agent session) are received. The inputs may be or may include, but are not limited to, text or other data from one or more of the agents indicating a request, command, or other instructions for the interaction (for example, instructions for another agent to use when participating in the interaction).

In an embodiment, inputs are received from each agent participating in the inter-agent session. As discussed further below, each agent may have a respective intent represented by a respective intent value or portion of an intent value. Accordingly, in such embodiments, intent may be tracked and managed per-agent. Analyzing intent (for example, to detect misalignments) as compared to communications from agent based on the intent for that agent allows for more accurately detecting misalignments, which therefore allows for further reducing hallucinations and, in turn, improving efficiency (for example, in terms of speed and/or computing resource usage) of the inter-agent session.

At S330, the inter-agent session is classified based on the received intent inputs. In some embodiments, the inter-agent session may be classified based on explicit inputs from one of the agents (for example, an input indicating that the type of interaction is a service request).

In another embodiment, the inter-agent session may be classified by inferring a classification based on the content of the received intent inputs. In a further embodiment, a genAI model (as a non-limiting example, a large language model) may be provided with inputs indicating potential classifications, a description of characteristics of each classification, and optionally one or more examples for each classification) . Such an AI model may return text or other content indicating the classification.

In yet another embodiment, the inter-agent session may be classified by applying a machine learning classifier model trained to classify inputs into potential classifications. Such a classifier model may be trained to output a classification based on input text. As a non-limiting example, the classifier model may be trained using a training set including training sets of text and training output classifications, where each training classification corresponds to a respective training set of text.

Non-limiting example classifications include service requests (for example, a request to access one or more computing services available via a server), purchases, requests for information, bids, and the like. Such classifications may be utilized to generate the intent, and may be further used to define roles for agents involved in an inter-agent session with respect to such an intent.

In an embodiment, the inter-agent session is managed based on the classification. To this end, in a further embodiment, S330 further includes determining a protocol to be applied based on the classification of the inter-agent session. Such a protocol may be a predetermined protocol which is associated with the classification. Accordingly, in yet a further embodiment, S330 includes selecting the protocol based on the classification (i.e., selecting the protocol from among multiple predetermined protocols, where each predetermined protocol is associated with a corresponding classification). The protocol may define the schema to be populated, rules to be used for determining intent, rules to be used for detecting misalignments from intent, rules to be applied for anomaly detection, combinations thereof, and the like.

At S340, one or more proposed intents are generated. In an embodiment, each proposed intent is text or other data indicating an intent to be used during the inter-agent session. As a non-limiting example, the proposed intent may be "Purchase a toy car" when the inputs from a first agent include data indicating a purchase activity and a subject of "toy car."

In some embodiments, multiple proposed intents are generated. In a further embodiment, a proposed intent is generated for each agent participating in the inter-agent session. In such an embodiment, the proposed intent generated for each agent may be determined based on one or more communications from that agent. As discussed herein, in some embodiments, multiple intents may be utilized in order to improve misalignment detection and, therefore further reduce hallucinations.

As noted herein, generative artificial intelligence (genAI) models which may be utilized to realize agentic AI solutions, have a tendency to hallucinate due to the partially randomized nature inherent in how many such models create content. It has been identified that these hallucinations may cause models used for agentic AI to lose track of the context of the broader interaction, which in turn may cause them to "manufacture" new focuses of the transaction. For example, "purchase a toy car" may morph into "purchase a Ferrari" (i.e., a real Ferrari, not a toy) during an inter-agent session, thereby derailing the interaction.

These hallucinations may therefore waste computing resources as agents negotiate or otherwise interact with respect to a goal which does not match the original intent. This makes interactions slower and utilizes excessive processing power and memory due to redundant or otherwise extraneous processing of inputs by models, network communications between models, storage of input data (for example, in local memories), total numbers of messages or other sets of data being transmitted, and the like. That is, hallucinations by one (or both) agents may cause the inter-agent session to deviate from an original goal, purpose, or focus. A hallucination by one agent may cause a cascading effect, where the other agent continues generating text or other content based on the hallucinated content. This can cause an inter-agent session to produce nonsense or otherwise inappropriate results.

It has been identified that defining a proposed intent at the outset of the interaction allows for anchoring the inter-agent session around a common goal, which reduces the effect of hallucinations on the models used to realize the AI agents. Additionally, the intent may be referenced by the system managing the inter-agent session (for example, the session manager 130) in order to detect misalignments (i.e., inputs from agents which deviate from the previously established intent). This allows for correcting any hallucinations that may occur earlier, thereby further improving the speed and further conserving computing resources which would otherwise need to be expended to return the inter-agent session to the proper goal.

In some embodiments, S340 further includes determining a role for each of the agents involved in the inter-agent session based on the proposed intent. The roles may be determined based further on the classification determined at S330. As a non-limiting example where the session is classified as a purchase and the proposed intent based on a request input from Agent A is "Purchase a toy car" which is directed to Agent B (i.e., Agent B belongs to the entity to which the request is detected), Agent A may be determined to have the role "buyer" and Agent B may be determined to have the role "seller."

In this regard, it has also been identified that agents may hallucinate content that switches roles or otherwise which alters the context of the interaction, which can result in similar issues to those discussed above with respect to hallucinating intent, goals, purpose, and the like. That is, an agent may "hallucinate its role" by producing an output which swaps, switches, or otherwise changes the role played by the agent in the interaction. As a non-limiting example, an agent which is originally intended to be the seller in a purchase interaction may produce text which suggests that the agent is looking to make a purchase (i.e., switching its role to buyer). Hallucinatory content which changes roles may cause the interaction to become derailed which, as noted above, may cause slower processing, extraneous or otherwise wasted use of computing resources, and the like.

Accordingly, it has been identified that utilizing roles in addition to intent allows for further anchoring the inter-agent session, which in turn allows the session to be processed faster and further reduce the amount of computing resources needed for the inter-agent session (for example, due to fewer communications being transmitted, fewer network transmissions, less inputs to be stored in memory, less processing of different inputs, etc.).

At S350, each proposed intent is verified. In an embodiment, verifying each proposed intent includes sending a message or other data indicating the proposed intent to one or more of the agents involved in the inter-agent communication. As a non-limiting example, when a proposed intent is provided explicitly by a first agent, the proposed intent may be transmitted to a second agent for verification. As another non-limiting example, when the proposed intent is inferred or otherwise generated based on inputs from a first agent, the proposed intent may be transmitted to both the first agent and a second agent for verification.

In embodiments where multiple proposed intents are generated, each proposed intent may be verified by sending a respective message or other data to the agent for which the proposed intent was generated. Each agent may return text or other content indicating whether the respective proposed intent is verified.

At S360, one or more intents are determined for the session. In an embodiment, each proposed intent is determined as an intent for the session when the proposed intent has been verified (for example, when all agents who were asked to verify the intent responded with text or other data indicating that the proposed intent is verified).

In an embodiment, determining the intent for the session further includes generating one or more intent values representing each proposed intent. The intent values may be used to populate a schema corresponding to the inter-agent session as discussed further below in order to map the inter-agent session to the intents.

At S370, one or more roles are determined. In an embodiment, a role is determined for each agent participating in the inter-agent session (for example, each of the agents 125 which is participating in the inter-agent session when the inter-agent session includes agents 125 such as depicted in FIGS. 1A-B).

In an embodiment, each role is defined with respect to the intent, for example, with respect to a type of interaction represented in the intent. As a non-limiting example, when the intent represents a purchase type of interaction, roles of agents may include buyer and seller. As another non-limiting example, when the intent represents a query or question-and-answer type of interaction, roles of agents may include inquirer and responder. As yet another non-limiting example, when the intent represents a service usage type of interaction, roles of agents may include requester and service provider.

At S380, one or more additional contextual parameters are determined. In an embodiment, the additional contextual parameters are determined based on data received from any or all of the agents involved in the inter-agent session.

The additional contextual parameters provide additional context such as, for example, additional data about the goal(s) of the interaction. The additional contextual parameters may include, but are not limited to, a target of the interaction (for example, an item to be purchased, a question to be answered, etc.), information about the agents participating in the inter-agent session, action (for example, an action being attempted or requested by the agent as indicated in a communication from the agent), status (for example, a status of the agent relative to a target or goal of the interaction), a combination thereof, and the like.

The information about the agents may be or may include, but is not limited to, language in which the user of each agent is communicating, group or subgroup to which the user of each agent belongs (for example, a subgroup within an organization such as a department or team), underlying model provider of the genAI model used by each agent (as a non-limiting example, OpenAI as the model provider for GPT-5), modality of the initial input from one or more of the agents (for example, text, images, audio, a combination thereof, etc.), combinations thereof, and the like. To this end, in a further embodiment, generating the mapping may further include prompting one or more of the agents using a prompt containing predetermined text corresponding to questions requesting this contextual data.

At S390, a mapping is generated. The mapping may map the agents to the inter-agent session, and may be utilized during subsequent processing for purposes of anchoring the inter-agent session. That is, the mapping may be utilized by the agent(s), by the session manager, or both, in order to avoid or otherwise reduce hallucinations which may cause the inter-agent session to be conducted less efficiently.

In an embodiment, generating the mapping includes populating fields of a schema (as a non-limiting example, a JavaScript Object Notation [JSON] schema) with respective values corresponding to contextual data of the inter-agent session. Such a schema may be defined in a protocol utilized by the system performing the method of FIG. 3 in order to ensure that the schema is shared by the agents involved in the inter-agent session. As noted above, this allows for anchoring the inter-agent session in order to minimize or otherwise mitigate hallucinations by and between the agents.

In a further embodiment, the fields at least include an intent field into which the intent determined at S360 is inserted. In yet a further embodiment, the fields also include one or more role fields such as, for example but not limited to, a role field corresponding to each of the agents involved in the inter-agent session. As a non-limiting example, a first role field may correspond to a first agent, and a second role field may correspond to a second agent.

In some embodiments, multiple intent fields may be included (for example, intent fields corresponding to different agents). In another embodiment, a single intent field may be utilized and populated with one or more intent values representing the intent of the inter-agent session, the intent of each agent participating in the inter-agent session, both, and the like.

In some embodiments, the fields may include one or more contextual fields which provide additional context regarding the inter-agent session. In such an embodiment, the contextual fields may be populated with respective contextual parameters, for example, among the contextual parameters determined at S380.

In some embodiments, the mapping is provided to any or all of the agents involved in the inter-agent session. To this end, the populated schema may be transmitted to each of the agents.

Figure 4:
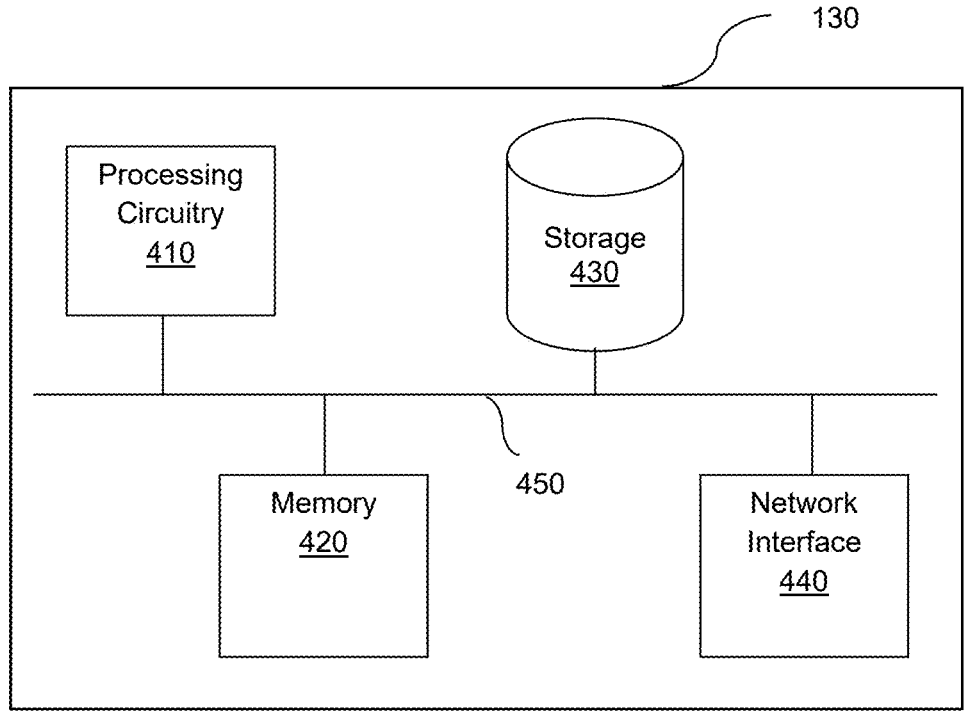
FIG. 4 is a schematic diagram of a session manager according to an embodiment.

FIG. 4 is an example schematic diagram of a session manager 130 according to an embodiment. The session manager 130 includes a processing circuitry 410 coupled to a memory 420, a storage 430, and a network interface 440. In an embodiment, the components of the session manager 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

In at least some embodiments, the processing circuitry 410 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 410 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 410 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 410 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors for use in computing attention weights. In at least some such embodiments using GPUs, the processing circuitry 410 may include a number of CPU cores which is equal to or greater than the number of GPUs in order to facilitate or otherwise support parallel processing via multiple GPUs.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the session manager 130 to communicate with other systems, devices, components, applications, or other hardware or software components, for example as described herein.

It should be understood that the embodiments described herein are not limited to the specific architecture illustrated in FIG. 4, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for mitigating generative artificial intelligence errors during inter-agent communications, the method comprising:

populating at least one intent field of a schema with at least one intent value representing an intent of an inter-agent communication session including a first artificial intelligence (AI) agent and a second AI agent, wherein the at least one intent value is determined based on a communication from the first AI agent;

comparing each of a plurality of inputs from the first AI agent and the second AI agent to the schema with respect to the at least one intent value;

detecting a misalignment between a first input of the plurality of inputs and the schema when a dissimilarity between the first input and at least a portion of the schema including the at least one intent value exceeds a threshold, wherein detecting the misalignment further comprises applying at least one machine learning model trained to classify values within communications into classes using a baseline learned via training, wherein the classes include misaligned and aligned; and performing a mitigation action based on the detected misalignment in order to mitigate an effect of at least one generative artificial intelligence error on the first input.

2. The method of claim 1, further comprising:

determining a proposed intent based on the communication from the first AI agent; and verifying the proposed intent by prompting the first AI agent, wherein the at least one intent value is determined based on the verified proposed intent.

3. The method of claim 1, further comprising:

determining a first role of the first AI agent and a second role of the second AI agent; and populating a first role field and a second role field of the schema with a first role value indicating the first role and a second role value indicating the second role, wherein the misalignment is detected based further on the first role value and the second role value.

4. The method of claim 1, further comprising:

classifying the inter-agent session into a classification based on the plurality of inputs; and selecting a first protocol from among a plurality of protocols based on the classification, wherein the first protocol defines the schema.

5. The method of claim 1, further comprising:

generating a vector representation of the at least a portion of the schema including the at least one intent value; and generating a vector representation of the first input, wherein the dissimilarity between the first input and the at least one intent value is determined based on the vector representation of the at least a portion of the schema including the at least one intent value and the vector representation of the first input.

6. The method of claim 5, further comprising:

determining a distance between the vector representation of the at least a portion of the schema including the at least one intent value and the vector representation of the first input, wherein the dissimilarity is determined based on the distance.

7. The method of claim 1, wherein the at least one intent value includes a first intent value and a second intent value, wherein the first intent value is determined based on the communication from the first AI agent, wherein the second intent value is determined based on a communication from the second AI agent.

8. The method of claim 1, further comprising:

tracking at least a portion of the plurality of inputs by recording transaction data generated based on the plurality of inputs on a blockchain.

9. The method of claim 1, wherein the first input is communicated by the first AI agent, wherein performing the mitigation action further comprises:

prompting the first AI agent with text indicating that the first input is misaligned, wherein the first AI agent provides a new first input in response to being prompted with the text indicating that the first input is misaligned.

10. The method of claim 1, wherein the at least one machine learning model trained to classify values is at least one non-generative machine learning model.

11. A non-transitory computer-readable medium having stored thereon instructions for causing a processing circuitry to execute a process, the process comprising:

populating at least one intent field of a schema with at least one intent value representing an intent of an inter-agent communication session including a first artificial intelligence (AI) agent and a second AI agent, wherein the at least one intent value is determined based on a communication from the first AI agent;

comparing each of a plurality of inputs from the first AI agent and the second AI agent to the schema with respect to the at least one intent value;

detecting a misalignment between a first input of the plurality of inputs and the schema when a dissimilarity between the first input and at least a portion of the schema including the at least one intent value exceeds a threshold, wherein detecting the misalignment further comprises applying at least one machine learning model trained to classify values within communications into classes using a baseline learned via training, wherein the classes include misaligned and aligned; and performing a mitigation action based on the detected misalignment in order to mitigate an effect of at least one generative artificial intelligence error on the first input.

12. A system for mitigating hallucinations during inter-agent communications, comprising:

a processing circuitry; and a memory, the memory containing instructions that, when executed by the processing circuitry, configure the system to:

populate at least one intent field of a schema with at least one intent value representing an intent of an inter-agent communication session including a first artificial intelligence (AI) agent and a second AI agent, wherein the at least one intent value is determined based on a communication from the first AI agent;

compare each of a plurality of inputs from the first AI agent and the second AI agent to the schema with respect to the at least one intent value;

detect a misalignment between a first input of the plurality of inputs and the schema when a dissimilarity between the first input and at least a portion of the schema including the at least one intent value exceeds a threshold, wherein detecting the misalignment further comprises applying at least one machine learning model trained to classify values within communications into classes using a baseline learned via training, wherein the classes include misaligned and aligned; and perform a mitigation action based on the detected misalignment in order to mitigate an effect of at least one generative artificial intelligence error on the first input.

13. The system of claim 12, wherein the system is further configured to:

determine a proposed intent based on the communication from the first AI agent; and verify the proposed intent by prompting the first AI agent, wherein the at least one intent value is determined based on the verified proposed intent.

14. The system of claim 12, wherein the system is further configured to:

determine a first role of the first AI agent and a second role of the second AI agent; and populate a first role field and a second role field of the schema with a first role value indicating the first role and a second role value indicating the second role, wherein the misalignment is detected based further on the first role value and the second role value.

15. The system of claim 12, further comprising:

classify the inter-agent session into a classification based on the plurality of inputs; and select a first protocol from among a plurality of protocols based on the classification, wherein the first protocol defines the schema.

16. The system of claim 12, wherein the system is further configured to:

generate a vector representation of the at least a portion of the schema including the at least one intent value; and generate a vector representation of the first input, wherein the dissimilarity between the first input and the at least one intent value is determined based on the vector representation of the at least a portion of the schema including the at least one intent value and the vector representation of the first input.

17. The system of claim 16, wherein the system is further configured to:

determine a distance between the vector representation of the at least a portion of the schema including the at least one intent value and the vector representation of the first input, wherein the dissimilarity is determined based on the distance.

18. The system of claim 12, wherein the at least one intent value includes a first intent value and a second intent value, wherein the first intent value is determined based on the communication from the first AI agent, wherein the second intent value is determined based on a communication from the second AI agent.

19. The system of claim 12, wherein the system is further configured to:

track at least a portion of the plurality of inputs by recording transaction data generated based on the plurality of inputs on a blockchain.

20. The system of claim 12, wherein the first input is communicated by the first AI agent, wherein the system is further configured to:

prompt the first AI agent with text indicating that the first input is misaligned, wherein the first AI agent provides a new first input in response to being prompted with the text indicating that the first input is misaligned.

\* \* \* \* \*